July 28, 1959     A. A. MILLER     2,897,092
POLYETHYLENE
Filed Dec. 16, 1955
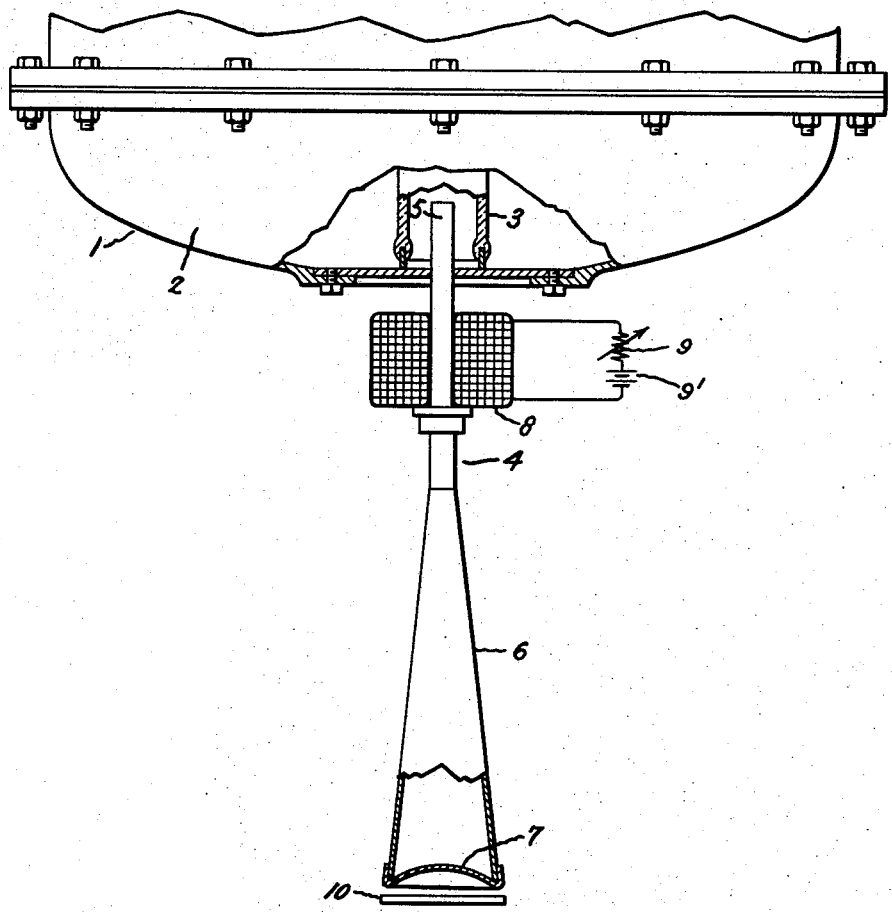
Inventor:
Alexander A. Miller,
by Paul A. Frank
His Attorney.

2,897,092

POLYETHYLENE

Alexander Andrew Miller, Schenectady, N.Y., assignor to General Electric Company, a corporation of New York Application December 16, 1955, Serial No. 553,485

12 Claims. (Cl. 117—47)

This invention relates to polyethylene of reduced permeability. More particularly this invention relates to a process of reducing the permeability of polyethylene toward oxygen and organic solvents which comprises (1) pretreating polyethylene so as to render it more capable of being bonded (also called "pretreating"), (2) applying thereto a material capable of being cross-linked by high energy radiation and which is less permeable to gases and organic solvents than polyethylene and (3) cross-linking the resulting polymer with high energy, ionizing radiation. Still more particularly this invention relates to a process of reducing the permeability of polyethylene toward oxygen and hydrocarbon solvents which comprises (1) pretreating polyethylene so as to render it more capable of being bonded, (2) applying water-containing polyvinyl alcohol (also called "PVA") thereto and (3) cross-linking the resulting water-containing polymer with high energy, ionizing radiation. This invention also relates to the products so produced.

Among the polymeric materials which have evolved in recent years, polyethylene has proved to be one of the most popular. Since fabrication, molding, extrusion and calendering of polyethylene are readily accomplished by standard methods, it has found wide usage for many purposes such as for example, an insulating material, as a container material, as a conduit material, etc. Although polyethylene possesses a great many desirable properties, it also possesses certain properties which are undesirable for certain applications. Thus, in the packaging art some of the undersirable properties of polyethylene are its relatively high permeability toward oxygen and certain organic solvents such as the hydrocarbons. For example, when benzene is stored in a sealed polyethylene container, a 30% loss of this solvent is noted after six days. In addition, it is undesirable to store in polyethylene containers those materials which are sensitive to air since oxygen permeates very rapidly therein to attack these materials. Thus, oils packed in polyethylene soon become rancid due to oxygen attack.

I have now discovered that the permeability of polyethylene to oxygen and hydrocarbon solvents can be markedly reduced by a process which comprises (1) pretreating polyethylene so as to render it more capable of being bonded, (2) applying water-containing polyvinyl alcohol thereto and, (3) cross-linking the resulting water-containing polymer with high energy, ionizing radiation. This treatment not only renders polyethylene many times less permeable to benzene and oxygen but it also bonds polyvinyl alcohol to polyethylene by a cross-linking mechanism that renders polyvinyl alcohol less soluble in water and the polyethylene itself stronger and more form stable. In addition, I have unexpectedly discovered that only by irradiating polyethylene which has been coated with water-containing polyvinyl alcohol can one obtain a polymer which is less permeable even after it has been treated with boiling water. Where polyethylene is treated similarly but irradiated after the polyvinyl alcohol is dried, the polyvinyl alcohol coating can be totally removed by boiling water. The significance of the discovery is that in addition to enhancing such physical properties such as high temperature tensile strength, tear strength and cut-through strength, etc., I had succeeded in producing polyethylene of reduced permeability toward oxygen, organic solvents and water.

The polyethylene referred to herein is a polymeric material formed by the polymerization of ethylene at either low or high pressures. It is described in Patent 2,153,553 Fawcett et al., and in "Modern Plastics Encyclopedia," New York, 1949, pages 268–271. Specific examples of commercially available polyethylene are the polyethylenes sold by E. I. du Pont de Nemours & Co., Inc., Wilmington, Delaware, examples of which are "Alathons 1, 3, 10, 12, 14, etc.," those sold by the Bakelite Company, such as "DE–2400, 3422, DYNH, etc.," and the low pressure Phillips Petroleum Company polymers, such as "Marlex 20, 50, etc." An excellent discussion of low pressure polyethylene within the score of this invention is found in "Modern Plastics," vol. 33 #1 (September 1955), commencing on page 85.

Since polyethylene itself is not capable of being easily bonded to other materials, various methods have been devised to increase its bonding characteristics. Although adhesive materials have been described in the prior art, it is preferable that the surface of the polyethylene be pretreated so that no adhesive is necessary. Many methods have been described for rendering polyethylene capable of being bonded. In one method the surace of polyethylene is oxidized with a flame, a hot combustion gas, or hot air in the manner described in Kreidl et al., Plastics Tech. 1, 31 (1955). Another method of oxidizing the surface comprises the use of ozone alone or ozone together with various gaseous accelerators as described in U.S. Patents 2,715,075; 2,715,076—both to Wolinski. Other methods include the treatment of polyethylene with nitrous oxide (2,715,072—Wolinski), the chlorination of the polyethylene surface as disclosed in U.S. Patent 2,502,841—Henderson, etc. Although these methods can be used, for ease of handling I prefer to use a liquid oxidizing medium such as disclosed in U.S. Patent 2,668,134—Horton wherein polyethylene is rendered more capable of being bonded by treatment with a dichromate-sulfuric acid solution.

After polyethylene has been rendered more capable of being bonded by the above described treatment, a coat of polyvinyl alcohol is applied to the pretreated polyethylene surface. Although the polyvinyl alcohol coat can be applied by any convenient method, it is most convenient to apply the coating from a dilute aqueous solution of polyvinyl alcohol and to allow the excess water to drain. Although I expected that similar results would be obtained by completely drying the polyvinyl alcohol coating prior to irradiation, I unexpectedly have found that the polyethylene-polyvinyl alcohol polymer remained less permeable even after treatment with boiling water only if this polymer contains water during irradiation. After irradiation the polymer is dried by means such as for example, by heat, motion of air, reduced pressure, etc. or combinations thereof. It is believed that water is necessary to promote the mechanism whereby the polymers can be cross-linked individually and intercross-linked by very stable bonds. These bonds are so stable that the polymer is less affected by water, by hot aqueous alkali and hot aqueous acids.

The amount of water in the polymer necessary to effect an impermeable product which is less affected by boiling water can be varied within wide limits. While there appears to be no upper limit to the amount of water necessary except as affects ease of operation, there is a minimum for the amount of water necessary. Although traces of water present during irradiation will render polyvinyl alcohols somewhat insoluble to boiling water, at least 10% but preferably 40% of water, based on weight of polyvinyl alcohol, should be employed for more total cross-linking.

The term "polyvinyl alcohol" as used herein refers to substantially unesterified polyvinyl alcohols as well as the products of partial alcoholysis or hydrolysis of polyvinyl esters which are impermeable toward oxygen and hydrocarbon solvents.

Since monomeric vinyl alcohol does not exist as such but rearranges to the more stable configuration of acetaldehyde, it is necessary to first prepare polyvinyl alcohol esters and then convert these compounds to polyvinyl alcohols by the deacylation of its esters. Nearly all of the desirable methods for preparing polyvinyl alcohol described in the literature include a procedure for the deacylation by hydrolysis or alcoholysis of polymeric vinyl esters using acidic or basic catalysts in an alcoholic medium. The solubility and viscosity of these completely or partially hydrolyzed products depends on molecular weight and the degree of deacylation and the solvents or mixtures of solvents used.

As is well known, polyvinyl alcohols can be made in different degrees of polymerization, the degree of polymerization depending upon the extent of polymerization of the parent ester from which the alcohol is derived and the degree of degradation occurring during deacylation. The molecular weights of the polyvinyl alcohol used in this invention can vary within wide limits, for example, from about 2,000 to 200,000 or higher, preferably 10,000–100,000. Most of these modifications in polyvinyl alcohols are to some degree soluble in water. Generally, the more highly polymerized forms are less readily soluble and produce solutions of higher viscosities for equal concentrations than lower polymers. The following are trade names of various polyvinyl alcohols: Gelvatol and Solvar (Shawinigan), Elvanol (Du Pont), Polyco 118 (American Polymer), Polyviol (Wacker), Vinarol (German), etc. Commercial solutions of polyvinyl alcohols are usually identified by code numbers, such as Elvanol 51–05. The first number (51) refers to the degree of hydrolysis while the second number (05) indicates the approximate viscosity in centipoises of a 4% solution in water at 20° C.

The preparation and properties of polyvinyl alcohol are described more fully in Schildknecht, Vinyl and Related Polymers, pages 341–358 (Wiley, 1952).

In the drawing, there is shown high voltage accelerating apparatus 1 capable of producing a beam of high energy electrons for irradiating polymeric materials in accordance with the invention. High voltage accelerating apparatus 1 may be of the type disclosed in Patent 2,144,518—Westendorp, assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 16, pages 128–133 (1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross-section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focusing of the accelerated electrons may be secured by a magnetic-field generating winding 8 energized by a source of direct current 9' through a variable resistor 9.

In producing polyethylene of reduced permeability according to the invention, a water-containing sheet or container of polyethylene coated with polyvinyl alcohol is supported in the path of the electrons emerging from end-window 7 as illustrated. The high energy electrons penetrate the polymeric material to a depth dependent upon their energy and effect the above modifications in the properties of the material. Of course, 10 can be in the form of a water-containing strip material which is passed continuously under end-window 7 at a velocity selected to give the desired irradiation dosage. Other expedients for obtaining the irradiation of these water-containing polymeric materials in various shapes (e.g., bottles, cups, tubing, filaments, pipes, etc.) will be apparent to those skilled in the art. Uniform treatment of polymeric materials having appreciable thickness can be assured by irradiating them first from one side and then the other or in some cases from both sides simultaneously. In certain instances, it may be desirable to irradiate the polymeric materials in an atmosphere of nitrogen, argon, helium, krypton, or xenon, etc., to prevent the damaging effect of any corona which may be present.

The measure of the amount of irradiation is a Roentgen unit (R) which, as usually defined, is the amount of radiation that produces one electrostatic unit of charge per milliliter of dry air under standard conditions and, as employed herein, refers to the amount of electron radiation measured with an air equivalent ionization chamber at the position of the upper surfaces of the polymeric materials. A million Roentgen units ($1 \times 10^6$R) is designated by the term "MR."

The total irradiation dose to which the polymer is subjected will depend on the properties desired in the cross-linked product bearing in mind that less polyvinyl alcohol will be removed by boiling water if the polymer is totally cross-linked. In addition less irradiation need be used with PVA of a higher molecular weight. Thus, a total dose of from 1 to 100 MR or higher can be advantageously employed, but preferably 5 to 50 MR. Irradiation can be carried out below room, at room, or at elevated temperatures.

It will be readily realized that other forms of electron accelerating apparatus may be employed instead of high voltage apparatus 1. For example, linear accelerators of the type described by J. C. Slater in the "Reviews of Modern Physics," vol 20, No. 3, pages 473–518 (July 1948) may be utilized. To decrease wasteful energy absorption between the point of exit of electrons from the accelerating apparatus and polymeric materials, a vacuum chamber having thin entrance and exit windows may be inserted in the space.

In general, the energy of the irradiation preferably employed in the practice of my invention may range from about 50,000 to 20 million electron volts or higher depending upon materials. Although high energy electron irradiation is preferred since it produces a large amount of easily controllable high energy radiation within a short period of time without rendering the product radioactive, many other sources of high energy, ionizing radiation can also be used in my invention. Examples of such ionizing radiation sources are gamma rays, such as can be obtained from $Co^{60}$, "burnt" uranium slugs, fission by-products, such as waste solution, separated isotopes, such as $Cs^{137}$, gaseous fission products liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, deuterons, $\alpha$-particles, fission fragments, such as are available from modern cyclotrons, etc.

In order that those skilled in the art may better understand how the present invention may be practiced, the following examples are given by way of illustration and not by way of limitation. All parts and percentages are by weight. Irradiation in all examples was carried out with high energy electrons (800 kilovolts peak, kv. p.) derived from a resonant transformer cathode ray unit of the type shown in the drawing.

Polyethylene (Plax Corporation, 5 mil film) after being treated for 5 minutes at room temperature with a dichromate-sulfuric acid solution (prepared by diluting 35 ml. of saturated sodium dichromate with one liter of concentrated sulfuric acid) was rinsed thoroughly with water to produce a surface capable of being bonded. A thin coating of an aqueous solution of polyvinyl alcohol was applied. The coatings in these examples were applied by spreading a 5% solution of PVA (Elevanol 72–51) on the film and allowing the excess to drain off vertically, yielding a wet PVA film of about 0.5 mil per application. Two applications of solution produced PVA film of about 1 mil. Thereupon some of the products were irradiated at room temperature under the conditions described in Table I.

The permeabilities of these products were measured in aluminum Vapometer cups following the procedure of Simril and Hershberger, "Modern Plastics" 27, 97 (June 1950). In this procedure circular pieces of the film were stamped out, treated by the method indicated in Table I and sealed across the face of the Vapometer cup over the liquid benzene with the coated side exposed to benzene vapor. The films were sealed with an all-metal gasket and threaded-flange seal. The cups were weighed periodically to determine the benzene loss by permeation and allowed to stand 16–27 hours for the final measurement. The results are tabulated in Table I. Benzene loss was on the average rate based on final measurements after 16–27 hours. All polyethylene films except where otherwise stated were pretreated with dichromate solution.

TABLE I

*Permeability of polyethylene to benzene vapor*

| Ex. No. | Treatment | Benzene loss, gm./hr. | Comments |
|---|---|---|---|
| 1 | Uncoated | 0.17 | |
| 2 | Uncoated and irradiated | 0.17 | |
| 3 | Coated and unirradiated | 0.015 | |
| 4 | Example 3, after 5 min. in boiling $H_2O$. | 0.18 | About same value as uncoated polyethylene Example 1. |
| 5 | Coated and irradiated dry (10 MR). | 0.016 | |
| 6 | Example 5, after 5 min. in boiling $H_2O$. | 0.15 | Do. |
| 7 | Coated, reswollen with 5% PVA, irradiated while wet (10 MR). | 0.002 | Thicker coat (about 1 mil). |
| 8 | Example 7, after 5 min. in boiling $H_2O$. | 0.025 | Note less permeable than Ex. 1. |
| 9 | Coated, reswollen with $H_2O$, irradiated while wet (10 MR). | 0.006 | |
| 10 | Coated, drained, irradiated while wet (10 MR). | 0.001 | Thin coat (about 0.5 mil). |
| 11 | Untreated, uncoated, polyethylene (5 mil). | 0.14 | |
| 12 | Untreated, uncoated, Marlex–50 (2 mil). | 0.06 | Note that this highly crystalline polyethylene has ⅓ value of low molecular wt. polyethylene. Example 11. |
| 13 | Coated, reswollen with PVA (7%), irradiated while wet (10 MR). | 0.010 | PVA coating about 1 mil. |
| 14 | Example 13, after 5 min. in boiling $H_2O$. | 0.010 | |
| 15 | Coated, reswollen with PVA (7%), irradiated while wet (20 MR). | 0.013 | Do. |
| 16 | Example 15, after 5 min. in boiling $H_2O$. | 0.033 | |
| 17 | Coated (7% PVA), drained, irradiated while wet (10 MR). | 0.007 | PVA coating about 0.5 mil. |
| 18 | Example #17, after 5 min. in boiling $H_2O$. | 0.031 | |

Concerning uncoated polyethylene, it is evident from Table I that polyethylene itself whether treated (Example 1), untreated (Examples 1 and 12) or irradiated (Example 2) is very permeable to benzene. It is of particular interest that highly crystalline, high molecular weight polyethylene (Example 12) is less permeable to benzene than less crystalline, lower molecular weight polyethylene (Example 11). Correcting for film thickness Marlex–50 is one-fifth as permeable to benzene vapor as low molecular weight polyethylene.

Concerning coated but unirradiated polyethylene, Examples 3 and 4 show that the PVA coat on pretreated polyethylene is removed by boiling water so that the resulting polymer has about the same permeability as polyethylene itself.

Concerning polyethylene which had been pretreated, coated and irradiated in a dry state, Examples 5 and 6 show that the polyvinyl alcohol coat so treated is soluble in boiling water thus resulting in a product which is about as permeable to benzene as polyethylene itself.

Concerning polyethylene which has been pretreated, coated, and irradiated while containing water, it is evident that such a treatment results in polyethylene which is less permeable to benzene and less soluble in boiling water. When Examples 7, 9, 10, 13, 15, and 17 (irradiated while water-wet) are subsequently treated with boiling water (Examples 8, 14, 16, 18), there is less change in permeability as compared to a polyvinyl alcohol coating which is unirradiated or irradiated in a dry state.

The process of this invention is particularly useful for coating interiors of polyethylene containers, such as cups, bottles, etc. which are used for holding hydrocarbon solvents. After the interior of the container has been pretreated, for example, with dichromate solution and washed, the containers are coated on the inside with PVA. A useful technique for effecting this coating is to place a small amount of PVA solution in the container, to rotate the container until the entire interior surface is wet and to allow the excess PVA solution to drain by gravity. Thereupon the coated container is passed under high energy irradiation while being rotated so as to effectively irradiate all parts of the container.

In addition to the techniques described above, other techniques can also be used. For example, a commercial PVA film can be bonded to pretreated polyethylene using PVA as an adhesive. An example of this method is shown in the following example.

*Example 19.*—A polyethylene film (5 mils) is pretreated with dichromate solution, washed with water, coated with 5% PVA (Elvanol 72–51) and the excess PVA solution drained by gravity. Thereupon a water-containing 1 mil PVA film is placed thereon and this composite structure is irradiated under an electron beam with 10 MR. The resulting product is dried, yielding a less permeable film.

Because of its reduced permeability to hydrocarbons, sheets prepared according to this invention can be used to package fatty foods such as butter, fat meats, etc. In addition, containers can be used as "squeeze bottles" for such hydrocarbon containing commercial preparations as skin lotions, sunburn lotions, hydrocarbon containing insecticides, etc. Because the products of this invention are less permeable to oxygen, they can be used to package foods, drugs, etc. which are sensitive to oxygen. These materials can be substituted for polyethylene materials now in use whenever reduced permeability is desired.

Variations in the above techniques will be evident to one skilled in the art. For example, fillers, stabilizers, antioxidants, etc. may be added to either or both polyethylene and polyvinyl alcohol without departing from the scope of the invention.

What I claim as new and desire to secure by Letters Patent of the United States is:

1. A process of reducing the permeability of polyethylene which comprises (1) pretreating polyethylene so as to render it more capable of being bonded, (2) applying thereto a polyvinyl alcohol containing at least 10% water based on the weight of the polyvinyl alcohol and (3) cross-linking the resulting water-containing polymer by irradiating it with ionizing radiation having energy equivalent to at least $5 \times 10^4$ electron volts to a dose of $1-100 \times 10^6$R.

2. A product which is less permeable to oxygen and hydrocarbon solvents than polyethylene, said product being polyethylene containing a surface of polyvinyl alcohol which has been cross-linked to the polyethylene and rendered insoluble in boiling water by the method of claim 1.

3. The process of claim 1 wherein pretreatment is effected with dichromate-sulfuric acid solution.

4. The process of claim 1 wherein electrons are the source of ionizing radiation.

5. A product which is less permeable to oxygen and hydrocarbon solvents than polyethylene, said product being polyethylene containing a surface of polyvinyl alcohol which has been cross-linked to the polyethylene and rendered insoluble in boiling water by the method of claim 3.

6. A process of reducing the permeability of polyethylene which comprises (1) pretreating polyethylene so as to render it more capable of being bonded, (2) applying polyvinyl alcohol thereto, (3) applying a preformed polyvinyl alcohol film thereto, the amount of water present in the polyvinyl alcohol composite of (2) and (3) being at least 10% by weight of the polyvinyl alcohol, and (4) cross-linking the resulting water-containing polymer by irradiating it with ionizing radiation having energy equivalent to at least $5 \times 10^4$ electron volts to a dose of $1-100 \times 10^6$R.

7. The process of claim 6 wherein electrons are the source of ionizing radiation.

8. A product which is less permeable to oxygen and hydrocarbon solvents than polyethylene, said product being polyethylene containing a surface of polyvinyl alcohol which has been cross linked to the polyethylene and rendered insoluble in boiling water by the method of claim 5.

9. The process of claim 5 where pretreatment is effected with dichromate-sulfuric acid solution.

10. A product which is less permeable to oxygen and hydrocarbon solvents than polyethylene, said product being polyethylene containing a surface of polyvinyl alcohol which has been cross-linked to the polyethylene and rendered insoluble in boiling water by the method of claim 7.

11. The process of claim 4 wherein the energy of the electrons is in the range of $5 \times 10^4$ to $2 \times 10^7$ electron volts.

12. The process of claim 7 wherein the energy of the electrons is in the range of $5 \times 10^4$ to $2 \times 10^7$ electron volts.

References Cited in the file of this patent

UNITED STATES PATENTS

| | | |
|---|---|---|
| 2,668,134 | Horton | Feb. 2, 1954 |

FOREIGN PATENTS

| | | |
|---|---|---|
| 732,047 | Great Britain | June 15, 1955 |
| 714,843 | Great Britain | Sept. 1, 1954 |

OTHER REFERENCES

Lawton et al.: Nature, vol. 172, pp. 76, 77, July 11, 1953.

B.N.L., 367, A.E.C., pp. 27, 28, February 1956.

Symposium on "Utilization of Fission Products," Harwell, A.E.R.E., C/R 1231, pages 112–117, February 23–24, 1953.

Sun: "Modern Plastics," vol. 32, No. 1, pages 141–144, 146, 148, 150, 229–233, 236–238.